United States Patent
Suk et al.

(10) Patent No.: US 11,915,454 B2
(45) Date of Patent: Feb. 27, 2024

(54) COLOR PALETTE FOR CAPTURING PERSON'S IMAGE FOR DETERMINATION OF FACIAL SKIN COLOR, AND METHOD AND APPARATUS USING SAME

(71) Applicant: KOREA ADVANCED INSTITUTE OF SCIENCE AND TECHNOLOGY, Daejeon (KR)

(72) Inventors: Hyeon-Jeong Suk, Daejeon (KR); Yuchun Yan, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 179 days.

(21) Appl. No.: 17/595,269

(22) PCT Filed: Sep. 26, 2019

(86) PCT No.: PCT/KR2019/012485
§ 371 (c)(1),
(2) Date: Nov. 12, 2021

(87) PCT Pub. No.: WO2020/230959
PCT Pub. Date: Nov. 19, 2020

(65) Prior Publication Data
US 2022/0215587 A1 Jul. 7, 2022

(30) Foreign Application Priority Data
May 15, 2019 (KR) .................. 10-2019-0056782

(51) Int. Cl.
*G06T 7/90* (2017.01)

(52) U.S. Cl.
CPC ...... *G06T 7/90* (2017.01); *G06T 2207/10024* (2013.01); *G06T 2207/30201* (2013.01)

(58) Field of Classification Search
CPC ............. G06T 7/90; G06T 2207/10024; G06T 2207/30201; G06T 2207/30208;
(Continued)

(56) References Cited

U.S. PATENT DOCUMENTS 5,852,675 A * 12/1998 Matsuo ................ H04N 1/6033
382/167
2008/0260218 A1* 10/2008 Smith ..................... A61B 5/445
382/128
(Continued)

FOREIGN PATENT DOCUMENTS

| CN | 103565419 A | 2/2014 |
| CN | 106973278 A | 7/2017 |

(Continued)

OTHER PUBLICATIONS

Tomlinson, Terri, "Flesh Tone Color Wheel", published at https://thefleshtonecolorwheel.com and archived at archive.org as of Aug. 8, 2018 (Year: 2018).*
(Continued)

*Primary Examiner* — William A Beutel
(74) *Attorney, Agent, or Firm* — Hoffman Warnick LLC

(57) ABSTRACT

Various embodiments relate to a color palette for capturing a person's image for determination of a facial skin color, and a method and an apparatus using same. Various embodiments may provide a color palette, and a method and an apparatus using same, the color palette comprising: a central area which is provided to define a skin region in a facial image, and is empty or transparent; and a plurality of color areas which are provided to define a plurality of reference regions for use in determining a skin color of the skin region in the facial image, and arranged to surround the central area and disposed according to a rule determined on the basis of at least one color characteristic.

10 Claims, 11 Drawing Sheets

(58) Field of Classification Search
CPC .................. G06T 5/001; G06T 7/0014; G06T 2207/30088; A45D 2044/007; H04N 9/64; H04N 23/10; G06V 40/162; G06V 10/56
See application file for complete search history.

(56) References Cited

U.S. PATENT DOCUMENTS

| | | |
|---|---|---|
| 2013/0300761 A1 | 11/2013 | Ahmed |
| 2015/0228123 A1* | 8/2015 | Yasutake ............... G06T 19/006 345/633 |
| 2018/0008188 A1* | 1/2018 | Adiri .................... A61B 5/1032 |

FOREIGN PATENT DOCUMENTS

| | | |
|---|---|---|
| KR | 101563124 B1 | 10/2015 |
| KR | 101570616 B1 | 11/2015 |
| KR | 20180072021 A | 6/2018 |
| KR | 101967814 B1 | 4/2019 |

OTHER PUBLICATIONS

Tomlinson, Terri, "How to Use The Flesh Tone Color Wheel", published at https://www.youtube.com/watch?v=sAOGfLrdIn8 as of Mar. 26, 2018 (Year: 2018).*
PCT International Search Report for International Application No. PCT/KR2019/012485, dated Feb. 12, 2020, 2 pages.

* cited by examiner

COLOR PALETTE FOR CAPTURING PERSON'S IMAGE FOR DETERMINATION OF FACIAL SKIN COLOR, AND METHOD AND APPARATUS USING SAME

TECHNICAL FIELD

Various embodiments relate to a color palette for capturing a person image in order to determine a facial skin color and a method and apparatus using the same.

BACKGROUND ART

In performing color calibration on a digital image or accurately confirming a phenomenon in which a color is distorted by a light source upon image capturing, a color checker is used. If color calibration is performed on an image by using the color checker, optimized color calibration results for various color areas constituting the image are expected. Furthermore, in order to calculate the accuracy of the color calibration results, a colorimetric value obtained by directly measuring an object by using a spectrophotometer set as a standard illuminant and a color calibration result are compared. In general, a difference between a colorimetric value and a color calibration result is called a color difference. However, although color calibration is performed using the color checker, a color difference has a relatively large value. A skin color is different depending on race and is also various even within the same race. Accordingly, there is a difficulty in distinguishing between skin colors by using the color checker.

DISCLOSURE

Technical Problem

Various embodiments provide a method and apparatus for determining a skin color. Various embodiments provide a color palette as a photographing tool for determining a skin color, and a method and apparatus using the same. Various embodiments provide a color palette for capturing a person image in order to determine a facial skin color of a user and a method and apparatus using the same.

Technical Solution

An operating method of an electronic device according to various embodiments may include executing an application, capturing a facial image including a color palette, extracting a skin area and multiple reference areas from the facial image based on the color palette, detecting first colorimetric information for the skin area and second colorimetric information for the reference areas, and determining a skin color of the skin area by comparing the first colorimetric information and the second colorimetric information.

An electronic device according to various embodiments may include a camera module and a processor coupled to the camera module. The processor may be configured to execute an application, capture a facial image including a color palette through the camera module, extract, from the facial image, a skin area and multiple reference areas corresponding to the color palette, detect first colorimetric information for the skin area and second colorimetric information for the reference areas, and determine a skin color of the skin area by comparing the first colorimetric information and the second colorimetric information.

A color palette according to various embodiments may include a central section which is provided to define a skin area in a facial image including the color palette and is an empty space or transparent, and multiple color sections provided to define multiple reference areas to be used to determine a skin color of the skin area in the facial image, arranged to surround the central section and arranged according to a rule determined based on at least one color characteristic.

Advantageous Effects

According to various embodiments, the electronic device can more accurately determine a skin color in a facial image including the color palette with reference to a color characteristic of the color palette. In this case, a user can directly define a portion in which a skin color is to be identified by adjusting a location of the color palette in the face of the user. Accordingly, the electronic device can determine a skin color with respect to various portions of the face. Accordingly, the user can check a change in the skin according to at least any one of time or a place. Moreover, the electronic device can transmit, to an external device, information on a skin color of the user. Accordingly, consumer needs can be satisfied because a cosmetic maker having the external device uses the information to research and fabricate a product. Furthermore, the electronic device can calibrate a facial image based on a skin color of a user. Accordingly, the size of an error when the electronic device calibrating the facial image can be minimized.

MODE FOR INVENTION

Hereinafter, various embodiments of this document are described with reference to the accompanying drawings.

Figure 1:
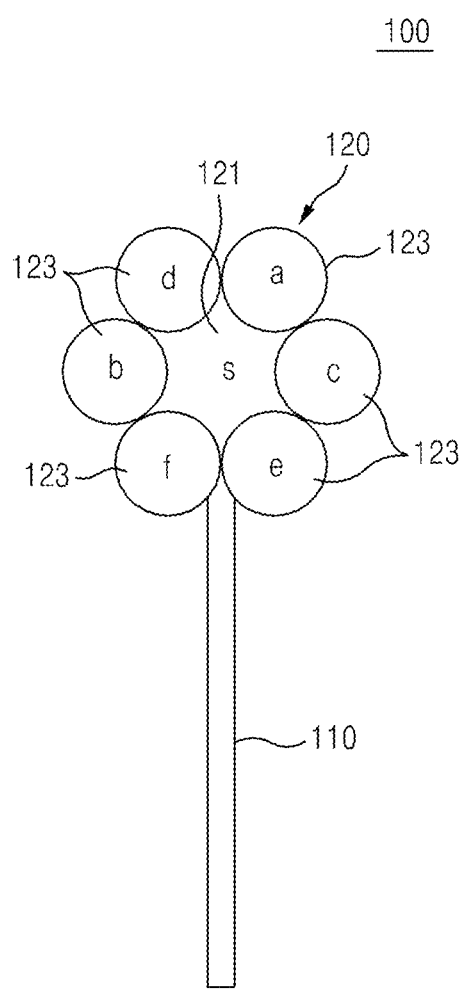
FIG. 1 is a diagram illustrating an electronic device according to various embodiments.

FIG. 1 is a diagram illustrating a color palette 100 according to various embodiments.

Referring to FIG. 1, the color palette 100 according to various embodiments may be used to determine a skin color of a user. To this end, when an electronic device (200 in FIG. 2) captures an image related to the skin of the user, the color palette 100 may be overlapped with the skin of the user. In this case, the color palette 100 may be overlapped with the face of the user. Accordingly, the electronic device 100 may capture a facial image including the color palette 100 and the face of the user.

According to various embodiments, the color palette 100 may include a grip part 110 and a head part 120. The grip part 110 may be gripped by a user. The grip part 110 may be formed in a bar shape, for example, but the present disclosure is not limited thereto. The head part 120 may be coupled to the grip part 110. The head part 120 may be used to substantially determine a skin color of a user. In this case, the head part 120 may be overlapped with the face of the user. The head part 120 may include a central section 121 and multiple color sections 123. The central section 121 may be an empty space or may be transparent. The color sections 123 may surround the central section 121 by being radially arranged around the central section 121. Furthermore, each of the color sections 123 may be disposed according to a rule determined based on at least one color characteristic. In this case, the color characteristic may include at least any one of brightness or a tone of a color provided to each of the color sections 123.

For example, color sections (a, b, c, d, e, and f) 123 may include six color sections (a, b, c, d, e, and f), that is, a first color section (a), a second color section (d), a third color section (b), a fourth color section (f), a fifth color section (e) and a sixth color section (c). The first color section (a), the second color section (d), the third color section (b), the fourth color section (f), the fifth color section (e) and the sixth color section (c) may be counterclockwise arranged on the basis of the central area (s) 121. In this case, color characteristics of the color sections (a, b, c, d, e, and f) may be defined based on CIE LAB. Brightness of each of the color sections (a, b, c, d, e, and f) may be defined based on reflectance L as in [Table 1] below, and may be lower in order of the first color section (a), the third color section (b), the sixth color section (c), the second color section (d), the fifth color section (e), and the fourth color section (f). Tones of the color sections (a, b, c, d, e, and f) may be defined based on chromaticity diagrams (a, b; b-1.1a) as in [Table 2] below, and may be lower in order of the sixth color section (c), the first color section (a), the third color section (b), the second color section (d), the fifth color section (e), and the fourth color section (f).

TABLE 1

| | Color name | L | a | b | b-1.1a | function | indicator |
|---|---|---|---|---|---|---|---|
| a | Light grayish yellow | 72.06 | −0.74 | 6.99 | 7.804 | Lightness 1 | 2.8 |
| b | 2Y04 | 68.54 | 8.64 | 14.45 | 4.946 | Lightness 2 | 3.1 |
| c | 4Y06 | 64.99 | 7.36 | 17.02 | 8.924 | Lightness 3 | 3.5 |
| d | 2R08 | 59.58 | 13.86 | 16.97 | 1.724 | Lightness 4 | 4.0 |
| e | 3R11 | 49.65 | 15.96 | 17.47 | −0.086 | Lightness 5 | 5.0 |
| f | Black | 0.24 | 0.24 | −0.41 | −0.674 | Lightness 6 | 7.9 |

TABLE 2

| | Color name | L | a | b | b-1.1a | function | indicator |
|---|---|---|---|---|---|---|---|
| c | 4Y06 | 64.99 | 7.36 | 17.02 | 8.924 | Tone 1 | Neutral |
| a | Light grayish yellow | 72.06 | −0.74 | 6.99 | 7.804 | Tone 2 | Neutral |
| b | 2Y04 | 68.54 | 8.64 | 14.45 | 4.946 | Tone 3 | Cool |
| d | 2R08 | 59.58 | 13.86 | 16.97 | 1.724 | Tone 4 | Cool |
| e | 3R11 | 49.65 | 15.96 | 17.47 | −0.086 | Tone 5 | Cool |
| f | Black | 0.24 | 0.24 | −0.41 | −0.674 | Tone 6 | Cool |

The color palette 100 according to various embodiments may include the central section 121 which is provided to define a skin area in a facial image including the color palette 100 and is an empty space or transparent, and the multiple color sections 123 which are provided to define multiple reference areas to be used to determine a skin color of the skin area in a facial image, arranged to surround the central section 121, and disposed according to a rule determined based on at least one color characteristic.

According to various embodiments, a color characteristic may include at least any one of brightness or a tone of a color provided to each of the color sections 123.

According to various embodiments, the color sections (a, b, c, d, e, and f) 123 may include the first color section (a), the second color section (d), the third color section (b), the fourth color section (f), the fifth color section (e) and the sixth color section (c) which are counterclockwise arranged.

According to various embodiments, brightness may be lower in order of the first color section (a), the third color section (b), the sixth color section (f), the second color section (d), the fifth color section (e), and the fourth color section (f).

According to various embodiments, a tone may be lower in order of the sixth color section (f), the first color section (a), the third color section (b), the second color section (d), the fifth color section (e), and the fourth color section (f).

Figure 2:
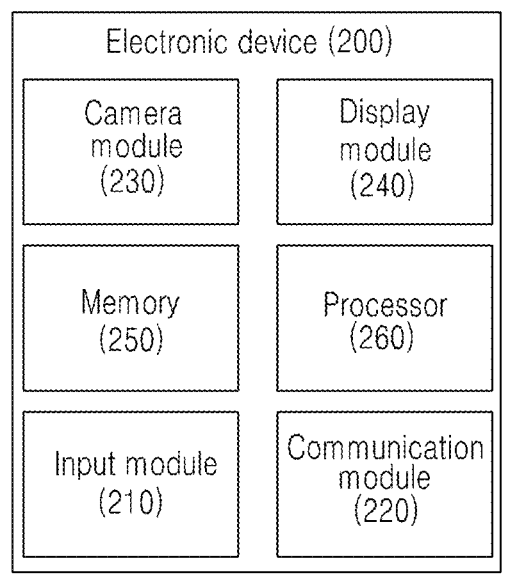
FIG. 2 is a diagram illustrating a color palette according to various embodiments.

FIG. 2 is a diagram illustrating an electronic device 200 according to various embodiments.

Referring to FIG. 2, the electronic device 200 according to various embodiments may include at least any one of an input module 210, a communication module 220, a camera module 230, a display module 240, a memory 250 or a processor 260. In an embodiment, at least any one of the components of the electronic device 200 may be omitted, or one or more component may be added to the electronic device 200.

The input module 210 receives an instruction to be used for at least one component of the electronic device 200. The input module 210 may include at least any one of an input device configured to enable a user to directly input an instruction or data to the electronic device 200 or a sensor device configured to generate data by detecting a surrounding environment. For example, the input device may include at least any one of a microphone, a mouse or a keyboard.

The communication module 220 may perform communication with an external device (not illustrated) in the electronic device 200. The communication module 220 may establish a communication channel between the electronic device 200 and the external device, and may perform communication with the external device through the communication channel. The communication module 220 may include at least any one of a wired communication module or a wireless communication module. For example, the wireless communication module may perform communication with the external device over at least any one of a long range communication network or a short range communication network.

The camera module 230 may capture an image. For example, the camera module 230 may include at least any one of a lens, an image sensor, an image signal processor or a flash.

The output module 240 may visually provide information to the outside of the electronic device 200. The output module 240 may include at least any one of a display module for visually providing information or an audio module for acoustically providing information. For example, the display module may include at least any one of a display, a hologram device or a projector. In an embodiment, the display module may include at least any one of touch circuitry configured to detect a touch or a sensor circuit configured to measure the intensity of a force generated by a touch.

The memory 250 may store various data used by at least one component of the electronic device 200. For example, the memory 250 may include at least one of a volatile memory or a nonvolatile memory. The data may include a program or input data or output data for an instruction related to the program. The program may be stored in the memory 250 as software, and may include at least any one of an operating system, middleware, or an application. The application may include an application for determining a skin color of a facial image. The memory 250 may store information related to the color palette 100. For example, the memory 250 may store color characteristics of the color sections (a, b, c, d, e, and f) 123 as in at least any one of [Table 1] or [Table 2].

The processor 260 may control at least one component of the electronic device 200 by executing a program of the memory 250, and may perform data processing or operation. The processor 260 may execute an application. The application may include an application for determining a skin color of a facial image.

The processor 260 may capture a facial image through the camera module 230 while executing an application. The facial image may include at least a part of a face of a user and the color palette 100. The processor 260 may extract a skin area and a reference area from the facial image based on the color palette 100. The processor 260 may extract the skin area from the facial image in accordance with the central section 121, and may extract reference areas from the facial image in accordance with the color sections 123. The processor 260 may detect colorimetric information for a skin area and reference areas. The processor 260 may detect first colorimetric information for the skin area, and may detect second colorimetric information for the reference areas. In this case, the first colorimetric information may include at least any one of brightness or a tone of the skin area. The second colorimetric information may include at least any one of brightness or a tone of each of the reference areas.

Accordingly, the processor 260 may determine a skin color of a skin area based on colorimetric information for the skin area and reference areas. At this time, the processor 260 may detect color information representing the skin color. According to a first embodiment, the processor 260 may transmit the color information to the external device through the communication module 220. According to a second embodiment, the processor 260 may calibrate a facial image based on the color information. According to a third embodiment, the processor 260 may display the color information through the display module.

The electronic device 200 according to various embodiments may include the camera module 230, and the processor 260 coupled to the camera module 230.

According to various embodiments, the processor 260 may be configured to execute an application, capture a facial image including the color palette 100 through the camera module 230, extract, from the facial image, a skin area and multiple reference areas corresponding to the color palette 100, detect first colorimetric information for the skin area and second colorimetric information for the reference areas, and determine a skin color of the skin area by comparing the first colorimetric information and the second colorimetric information.

The color palette 100 according to various embodiments may include the central section 121 which is provided to define a skin area and is an empty space or transparent and the multiple color sections 123 which are provided to define reference areas, arranged to surround the central section 121, and disposed according to a rule determined based on at least one color characteristic.

According to various embodiments, the color characteristic may include at least any one of brightness or a tone of a color provided to each of the color sections 123.

According to various embodiments, the color sections (a, b, c, d, e, and f) 123 may include the first color section (a), the second color section (d), the third color section (b), the fourth color section (f), the fifth color section (e), and the sixth color section (c) which are counterclockwise arranged.

According to various embodiments, brightness may be lower in order of the first color section (a), the third color section (b), the sixth color section (f), the second color section (d), the fifth color section (e), and the fourth color section (f).

According to various embodiments, a tone may be lower in order of the sixth color section (f), the first color section (a), the third color section (b), the second color section (d), the fifth color section (e), and the fourth color section (f).

According to various embodiments, the processor 260 may be configured to may determine whether reference areas are arranged according to a rule based on second colorimetric information for the reference areas and to determine a skin color of a skin area by comparing first colorimetric information and second colorimetric information if the reference areas are arranged identically with the rule.

According to various embodiments, the first colorimetric information may include at least any one of brightness or a tone of a skin area. The second colorimetric information may include at least any one of brightness or a tone of each of reference areas.

According to various embodiments, the processor 260 may be configured to capture a facial image again if reference areas are arranged differently from the rule.

According to various embodiments, the electronic device 200 may further include a display module coupled to the processor 260 and for displaying color information representing a skin color by the processor 260.

According to various embodiments, the electronic device 200 may further include the communication module 220 coupled to the processor 260 and for transmitting color information to an external device (not illustrated) by the processor 260.

According to various embodiments, the processor 260 may be configured to calibrate a facial image based on a skin color.

Figure 3:
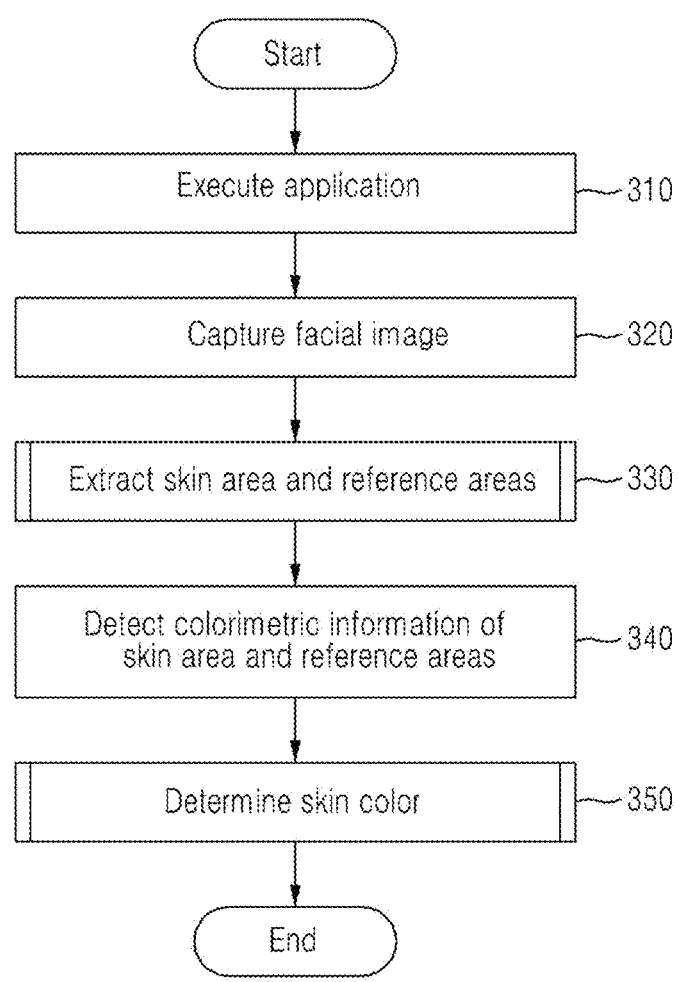
FIG. 3 is a diagram illustrating an operating method of the electronic device according to various embodiments.

FIG. 3 is a diagram illustrating an operating method of the electronic device 200 according to various embodiments. FIGS. 6, 7, 8, 9, 10 and 11 are diagrams for describing an operating method of the electronic device 200 according to various embodiments.

Figure 6:
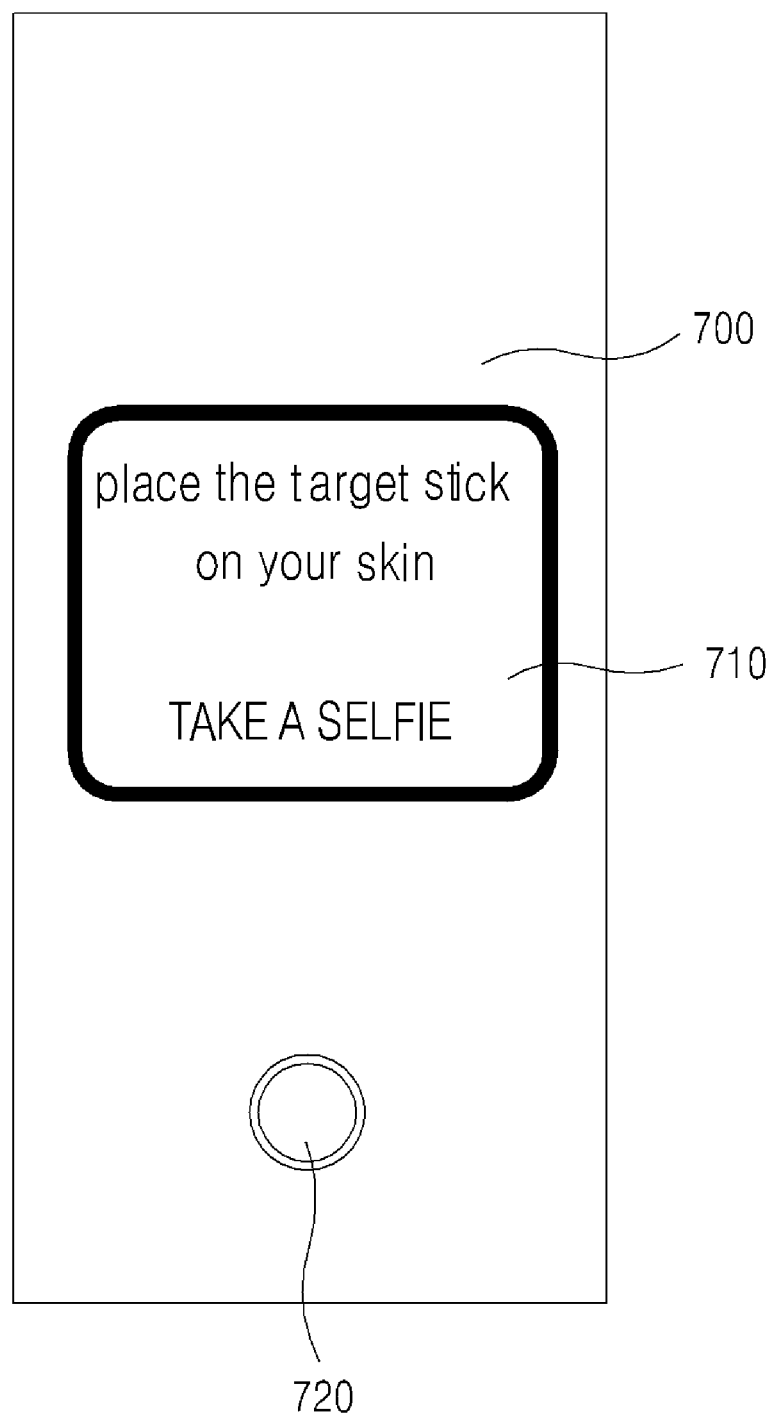
FIGS. 6, 7, 8, 9, 10 and 11 are diagrams for describing an operating method of the electronic device according to various embodiments.

Referring to FIG. 3, at operation 310, the electronic device 200 may execute an application. The application may include an application for determining a skin color of a facial image. In this case, the processor 260 may execute the application based on a request from a user, which is received through the input module 210. For example, as illustrated in FIG. 6, the processor 260 may execute the application while displaying an initial execution screen 600 through the display module.

Figure 7:
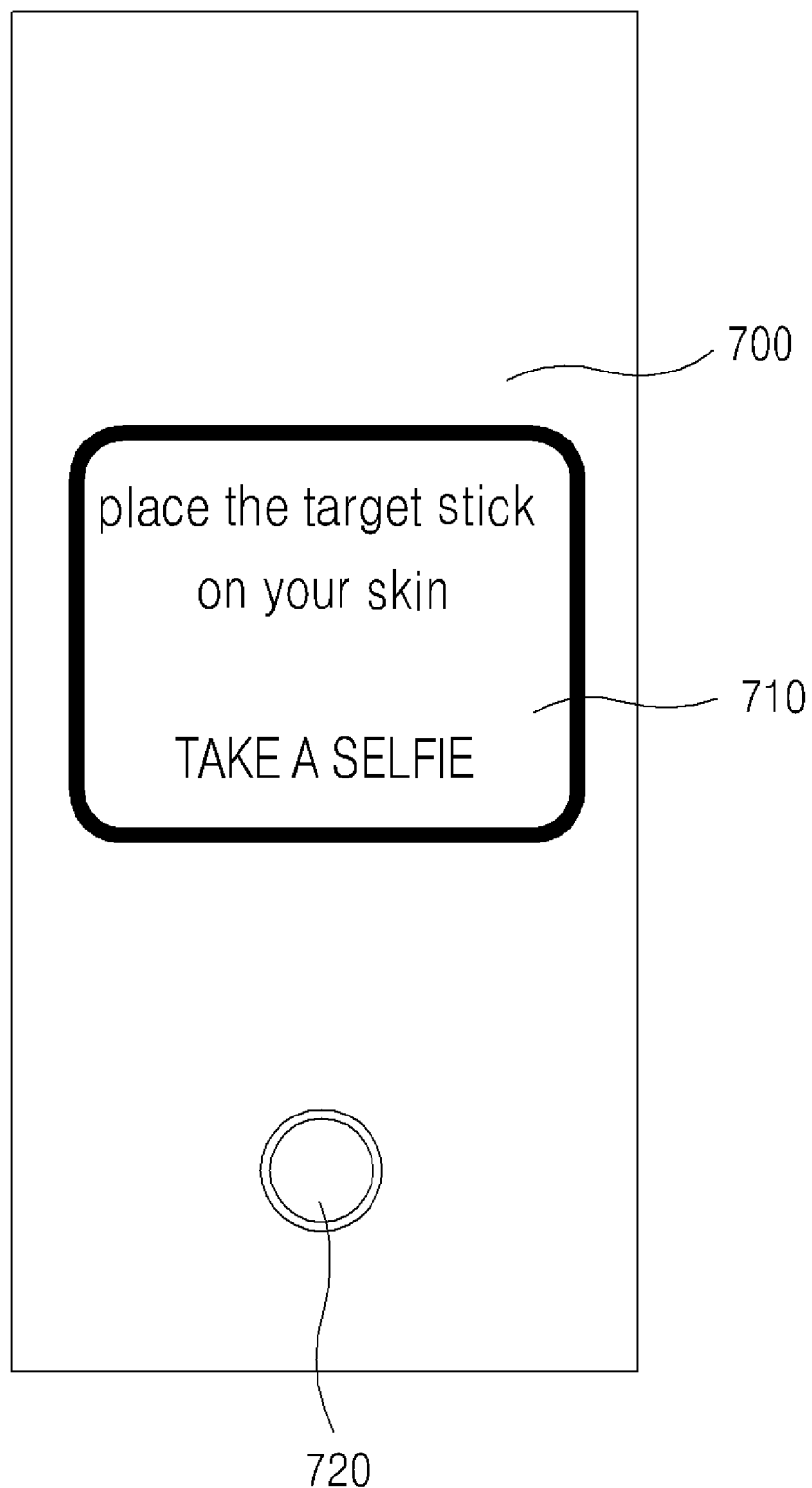

At operation 320, the electronic device 200 may capture a facial image while executing the application. While the color palette 100 is overlapped with the face of a user, the electronic device 200 may capture the facial image from the face of the user along with the color palette 100. The facial image may include at least a part of the face of the user and the color palette 100. In this case, when the application is executed, the processor 260 may activate the camera module 230. Furthermore, the processor 260 may capture the facial image through the camera module 230 based on a request from the user, which is received through the input module 210. For example, as illustrated in FIG. 7, the processor 260 may display a guide screen 700 through the display module. For example, the guide screen 700 may include at least any one of a message 710 which enables a user to overlap the color palette 100 with a face and to manipulate the electronic device 200 or a soft button 720 for inputting a request to capture a facial image.

Figure 8:
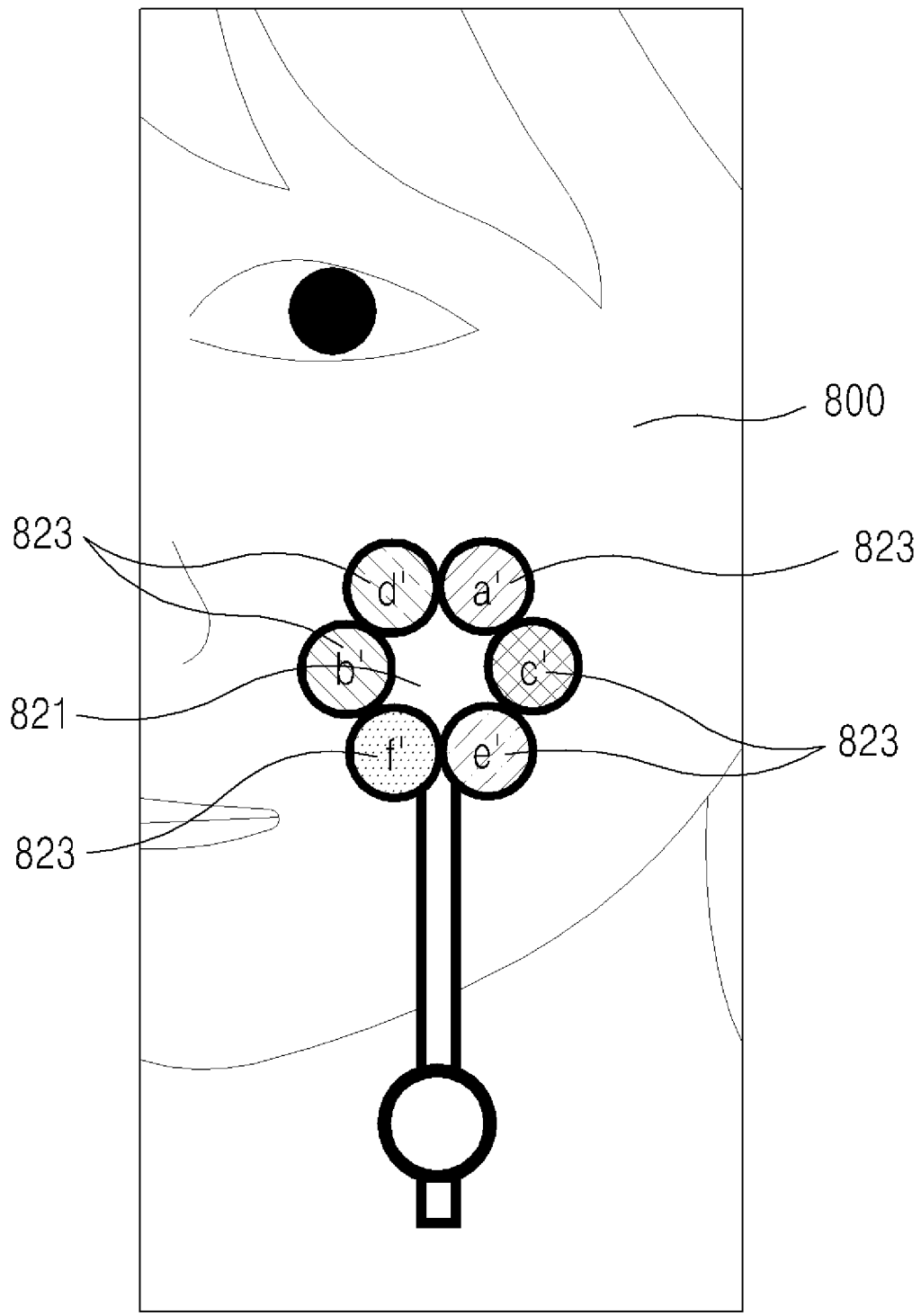

At operation 330, the electronic device 200 may extract a skin area 821 and reference areas 823 from a facial image 800. The electronic device 200 may extract the skin area 821 and the reference areas 823 from the facial image 800 based on the color palette 100. At this time, the processor 260 may identify the central section 121 and color sections 123 of the color palette 100 in the facial image 800. Furthermore, the processor 260 may extract the skin area 821 from the facial image 800 in accordance with the central section 121, and may extract the reference areas 823 in accordance with the color sections 123. For example, as illustrated in FIG. 8, the processor 260 may extract the skin area 821 and the reference areas 823 from the facial image 800.

For example, an array of the reference areas 823 may correspond to an array of the color sections 123. The reference areas (a', b', c', d', e', and f) 823 may include six reference areas, that is, a first reference area (a'), a second reference area (d'), a third reference area (b'), a fourth reference area (f'), a fifth reference area (e') and a sixth reference area (c'). The first reference area (a'), the second reference area (d'), the third reference area (b'), the fourth reference area (f'), the fifth reference area (e') and the sixth reference area (c') may correspond to the first color section (a), the second color section (d), the third color section (b), the fourth color section (f), the fifth color section (e) and the sixth color section (c), respectively. That is, the first reference area (a'), the second reference area (d'), the third reference area (b'), the fourth reference area (f), the fifth reference area (e') and the sixth reference area (c') may be counterclockwise arranged on the basis of the skin area (s') 821.

Figure 4:
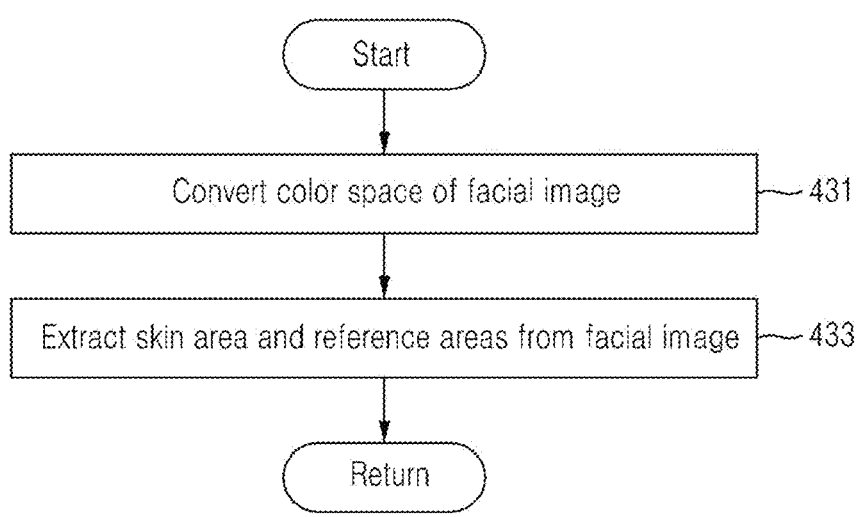
FIG. 4 is a diagram illustrating an operation of extracting a skin area and reference areas in FIG. 3.

FIG. 4 is a diagram illustrating the operation of extracting the skin area 821 and the reference areas 823 in FIG. 3.

Referring to FIG. 4, at operation 431, the electronic device 200 may convert a color space of the facial image 800. For example, the processor 260 may convert the color space of the facial image 800 into CIE LAB. At operation 433, the electronic device 200 may extract the skin area 821 and the reference areas 823 from the facial image 800. Thereafter, the electronic device 200 may return to FIG. 3.

At operation 340, the electronic device 200 may detect colorimetric information for the skin area 821 and the reference areas 823. The processor 260 may detect first colorimetric information for the skin area 821, and may detect second colorimetric information for the reference areas 823. In this case, the first colorimetric information may include at least any one of brightness or a tone of the skin area 821. The second colorimetric information may include at least any one of brightness or a tone of each of the reference areas 823.

According to an embodiment, when converting the color space of the facial image 800 into the CIE LAB, the processor 260 may detect the first colorimetric information and the second colorimetric information based on the CIE LAB. The processor 260 may measure brightness of the skin area 821 based on reflectance L of the skin area 821, and may measure brightness of each of the reference areas 823 based on reflectance L of each of the reference areas 823. When converting the color space of the facial image 800 into the CIE LAB, the processor 260 may measure a tone of the skin area 821 based on chromaticity diagrams (a, b; b-1.1a) of the skin area 821, and may measure a tone of each of the reference areas 823 based on chromaticity diagrams (a, b; b-1.1a) of each of the reference areas 823. The reflectance L and chromaticity diagrams (a, b; b-1.1a) of the skin area 821 and the reference areas 823 may be measured as in [Table 3] and [Table 4] below.

TABLE 3

| | Color name | L | a | b | b-1.1a | indicator |
|---|---|---|---|---|---|---|
| a' | Light grayish yellow | 80.46 | 0.87 | 12.12 | 11.163 | 2.8 |
| b' | 2Y04 | 76.05 | 11.59 | 21.34 | 8.591 | 3.1 |
| c' | 4Y06 | 74.15 | 10.66 | 24.35 | 12.624 | 3.5 |
| d' | 2R08 | 67.83 | 16.67 | 24.98 | 6.643 | 4.0 |
| e' | 3R11 | 56.56 | 19.5 | 24.03 | 2.58 | 5.0 |
| f | Black | — | — | — | — | 7.9 |
| s' | Skin | 78.97 | 13.14 | 18.44 | 3.986 | 2.9 |

TABLE 4

| | Color name | L | a | b | b-1.1a | indicator |
|---|---|---|---|---|---|---|
| c' | 4Y06 | 74.15 | 10.66 | 24.35 | 12.624 | Neutral |
| a' | Light grayish yellow | 80.46 | 0.87 | 12.12 | 11.163 | Neutral |
| b' | 2Y04 | 76.05 | 11.59 | 21.34 | 8.591 | Cool |
| d' | 2R08 | 67.83 | 16.67 | 24.98 | 6.643 | Cool |
| e' | 3R11 | 56.56 | 19.5 | 34.03 | 2.58 | Cool |
| f | Black | — | — | — | — | Cool |
| s' | Skin | 78.97 | 13.14 | 18.44 | 3.986 | Cool |

At operation 350, the electronic device 200 may determine a skin color of the skin area 821 based on the colorimetric information for the skin area 821 and the reference areas 823. The processor 260 may determine the skin color based on the first colorimetric information for the skin area 821 with reference to the second colorimetric information for the reference areas 823. At this time, the processor 260 may determine the skin color of the skin area 821 by comparing the first colorimetric information for the skin area 821 and the second colorimetric information for the reference areas 823. The processor 260 may detect color information representing the skin color.

Figure 5:
FIG. 5 is a diagram illustrating an operation of determining a skin color in FIG. 3.

FIG. 5 is a diagram illustrating the operation of determining the skin color in FIG. 3.

Referring to FIG. 5, at operations 551 and 553, the electronic device 200 may determine whether an array of the reference areas 823 complies with a predetermined rule. The rule may include at least any one of a brightness rule or a tone rule. As in Table 1, the brightness rule may indicate that in the color palette 100, the reflectance L of the color sections (a, b, c, d, e, and f) is lower in order of the first color section (a), the third color section (b), the sixth color section (c), the second color section (d), the fifth color section (e), and the fourth color section (f). As in [Table 2], the tone rule may indicate that in the color palette 100, the chromaticity diagrams (a, b; b-1.1a) are lower in order of the sixth color section (c), the first color section (a), the third color section (b), the second color section (d), the fifth color section (e), and the fourth color section (f).

According to an embodiment, at operation 551, the processor 260 may determine whether an array of the reference areas 823 complies with the brightness rule. Thereafter, at operation 553, the processor 260 may determine whether the array of the reference areas 823 complies with the tone rule.

According to another embodiment, at operation 551, the processor 260 may determine whether the array of the reference areas 823 complies with the tone rule. Thereafter, at operation 553, the processor 260 may determine whether the array of the reference areas 823 complies with the brightness rule. The processor 260 may determine whether brightness of the reference areas (a', b', c', d', e', f) is lower in order of the first reference area (a'), the third reference area (b'), the sixth reference area (c'), the second reference area (d'), the fifth reference area (e'), and the fourth reference area (f'). The processor 260 may determine whether tones of the reference areas (a', b', c', d', e', f) are lower in order of the sixth reference area (c'), the first reference area (a'), the third reference area (b'), the second reference area (d'), the fifth reference area (e'), and the fourth reference area (f).

Figure 9:
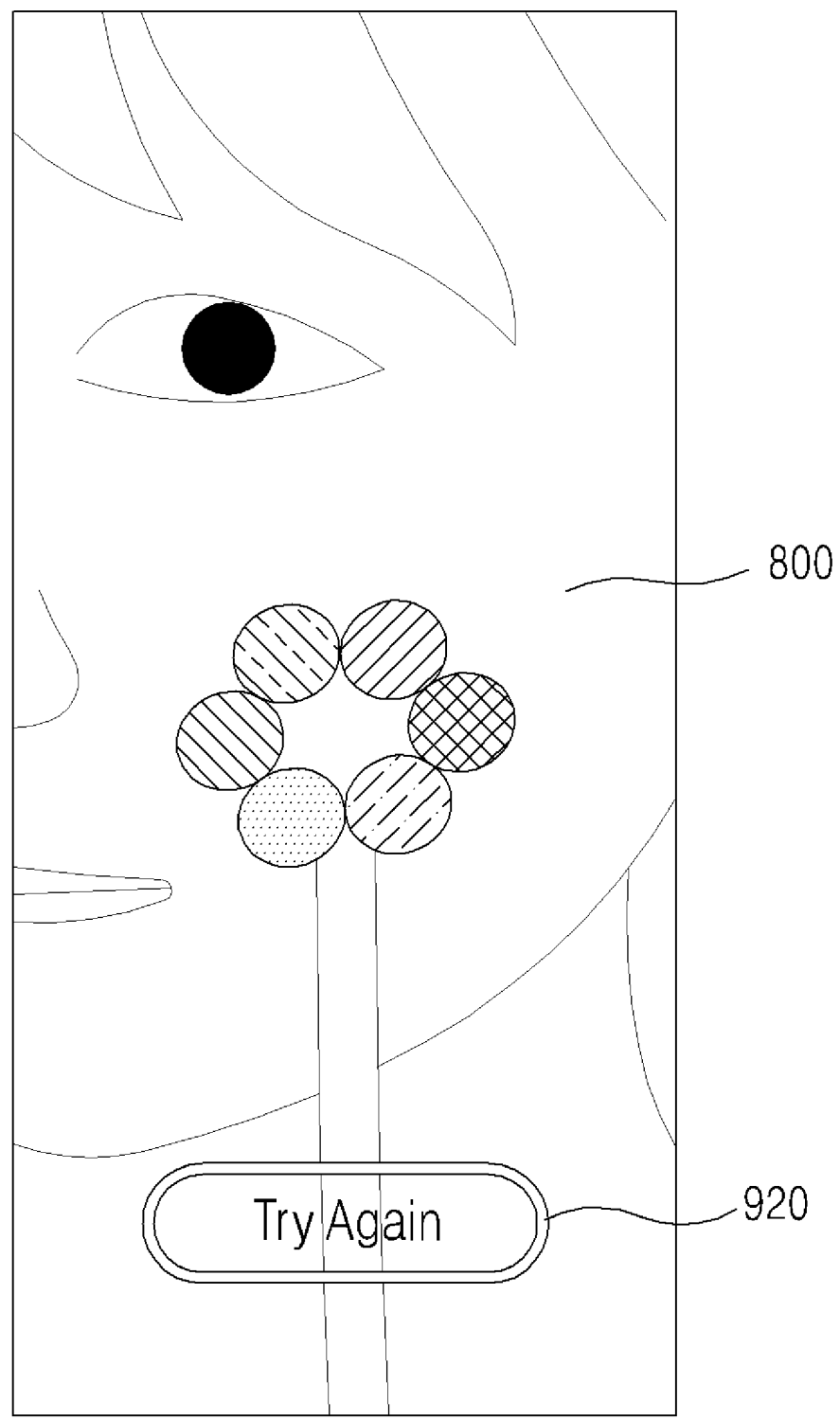

If it is determined that the array of the reference areas does not comply with the predetermined rule at operations 551 and 553, the electronic device 200 may return to operation 320 in FIG. 3. For example, as illustrated in FIG. 9, the processor 260 may display a soft button 920 for inputting a request for the re-capturing of a facial image in the facial image 800 through the display module. Furthermore, when the soft button 920 is selected, the processor 260 may return to operation 320. Accordingly, at operation 320, the processor 260 may capture a facial image again and perform operations 330 to 350 again.

If it is determined that the array of the reference areas complies with the predetermined rule at operations 551 and 553, at operation 555, the electronic device 200 may compare the first colorimetric information and the second colorimetric information. The processor 260 may compare brightness of the skin area (s') 821 and brightness of each of the reference areas (a', b', c', d', e', and f') 823. For example, as in Table 3, the processor 260 may check that reflectance L of the skin area (s') has a value between reflectance L of the first reference area (a') and reflectance L of the third reference area (b'). The processor 260 may compare a tone of the skin area 821 and a tone of each of the reference areas 823. For example, as in [Table 4], the processor 260 may check the chromaticity diagrams (a, b; b-1.1a) of the skin area (s') have values between the chromaticity diagrams (a, b; b-1.1a) of the second reference area (d') and the chromaticity diagrams (a, b; b-1.1a) of the third reference area (b').

At operation 557, the electronic device 200 may determine a skin color in the skin area 821. At this time, the electronic device 200 may detect color information representing the skin color. The color information may include at least any one of an indicator indicative of the brightness of the skin area 821 or an indicator indicative of the tone of the skin area 821. For example, the processor 260 may calculate a difference value between reflectance L of the skin area (s') and reflectance L of the first reference area (a') and a difference value between the reflectance L of the skin area (s') and reflectance L of the third reference area (b'). Accordingly, the processor 260 may detect the indicator indicative of the brightness of the skin area 821 as an interval value between an indicator indicative of brightness of the first color section (a) corresponding to the first reference area (a') and an indicator indicative of brightness of the third color section (b) corresponding to the third reference area (b'). For example, the processor 260 may calculate a difference value between the chromaticity diagrams (a, b; b-1.1a) of the skin area (s') and the chromaticity diagrams (a, b; b-1.1a) of the second reference area (d') and a difference value between the chromaticity diagrams (a, b; b-1.1a) of the skin area (s') and the chromaticity diagrams (a, b; b-1.1a) of the third reference area (b'). Accordingly, the processor 260 may detect the indicator indicative of the tone of the skin area 821 based on an indicator indicative of a tone of the second color section (d) corresponding to the second reference area (d') and an indicator indicative of a tone of the third color section (b) corresponding to the third reference area (b'). Thereafter, the electronic device 200 may return to FIG. 3.

Figure 10:
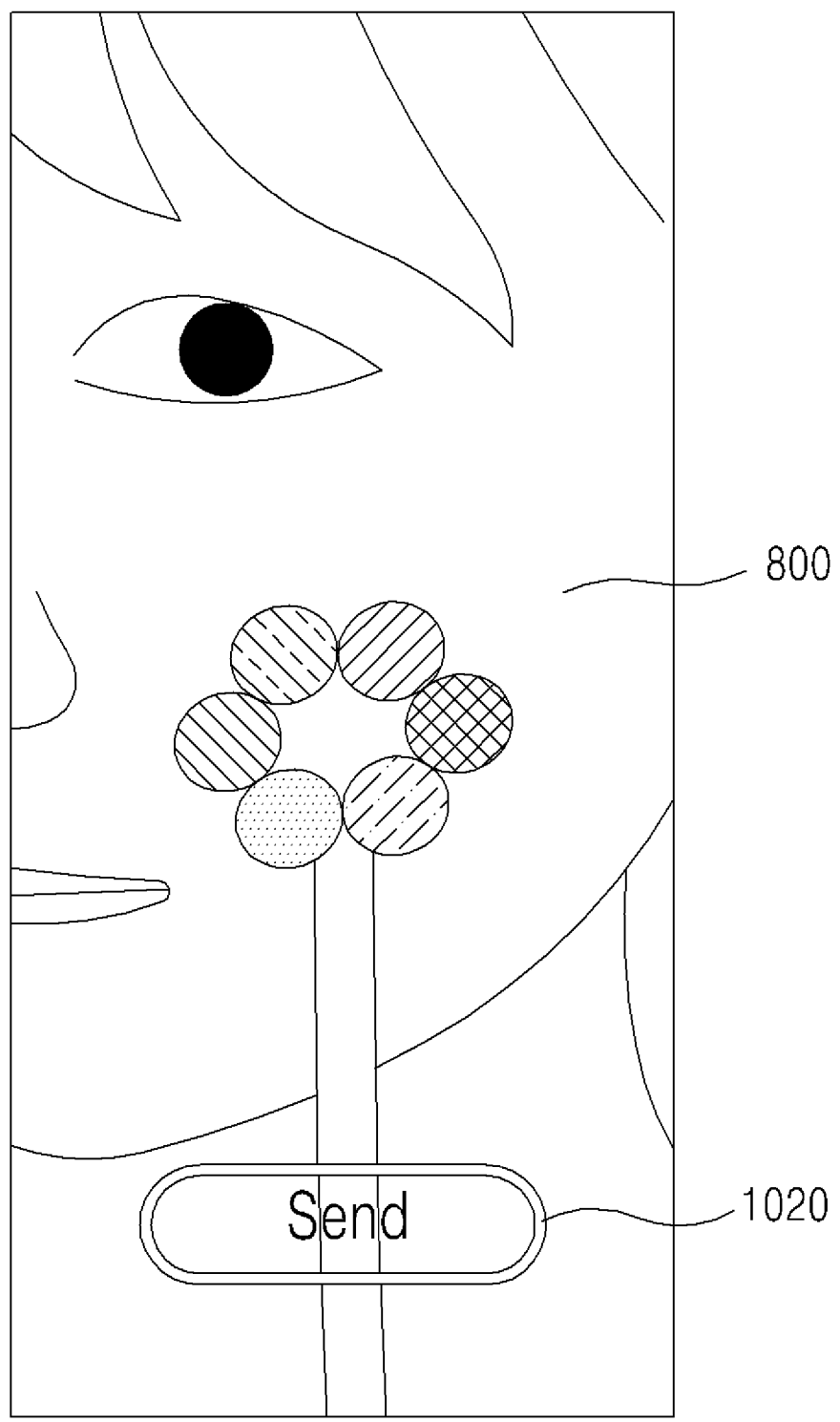

According to a first embodiment, the electronic device 200 may transmit color information to an external device through the communication module 220. For example, as illustrated in FIG. 10, the processor 260 may display a soft button 1020 for inputting a request for the transmission of color information in the facial image 800 through the display module. Thereafter, when the soft button 1020 is selected by a user, the processor 260 may transmit the color information to the external device. The external device may include at least any one of a server or another electronic device. For example, the external device may be operated by a cosmetic maker, etc.

According to a second embodiment, the electronic device 200 may calibrate a facial image based on color information.

Figure 11:
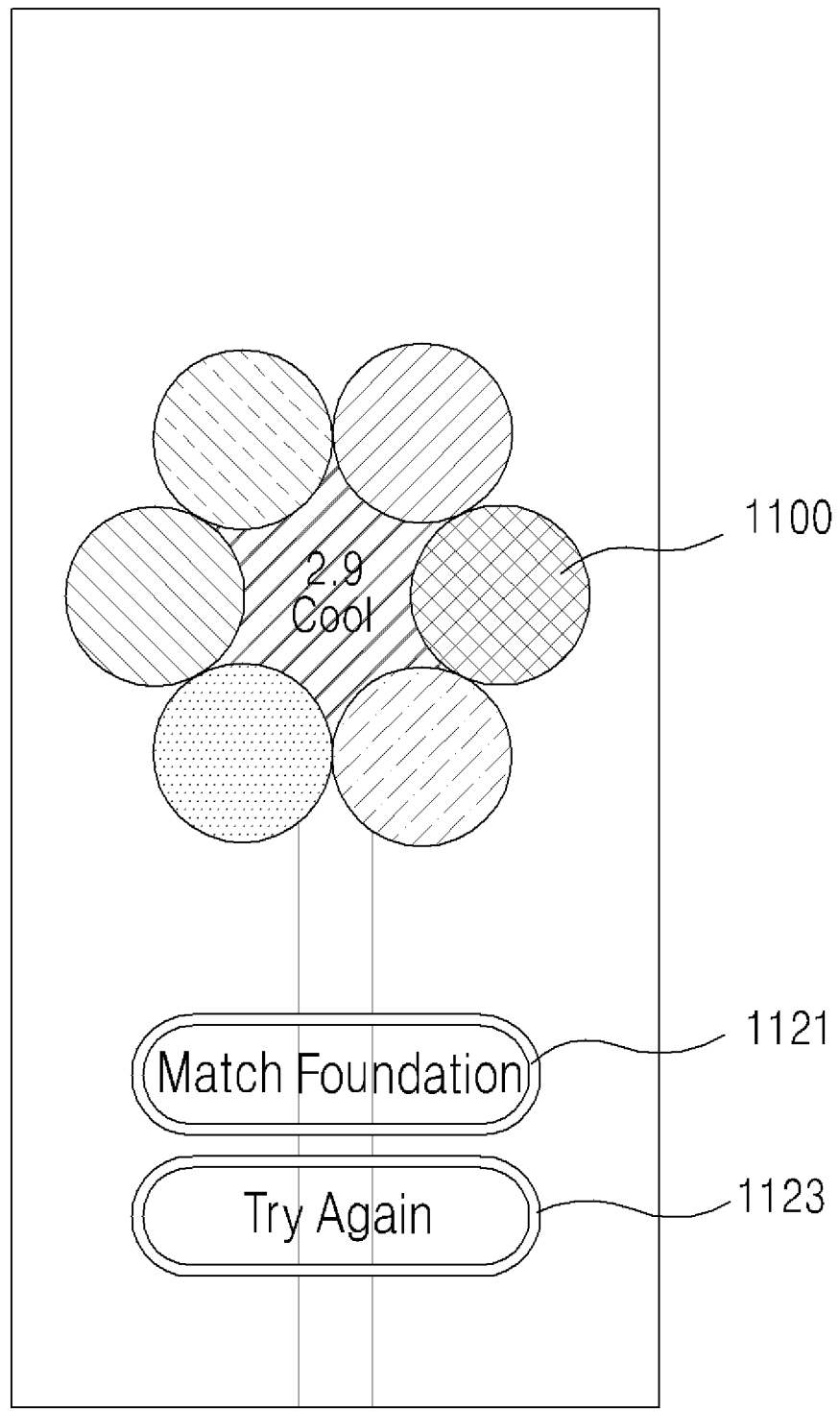

According to a third embodiment, the electronic device 200 may display color information through the display module. For example, as illustrated in FIG. 11, the processor 260 may display an information display screen 1100 indicating color information through the display module. In this case, the information display screen 1100 may include at least any one of a soft button 1121 for inputting a request for the execution of a predetermined function based on color information or a soft button 1123 for inputting a request for the re-capturing of a facial image. For example, when the soft button 1121 is selected, the processor 260 may execute a predetermined function on at least any one of the facial image or the color information. The function may include at least any one of a function for calibrating a facial image, a function for storing at least any one of a facial image or color information, or a function for transmitting at least any one of a facial image or color information. For another example, when the soft button 1123 is selected, the processor 260 may return to operation 320 in FIG. 3. Accordingly, at operation 320, the processor 260 may capture a facial image again, and may perform operations 330 to 350 again.

An operating method of the electronic device 200 according to various embodiments may include an operation of executing an application, an operation of capturing the facial image 800 including the color palette 100, an operation of extracting the skin area 821 and the multiple reference areas 823 from the facial image 800 based on the color palette 100, n operation of detecting first colorimetric information for the skin area 821 and second colorimetric information for the reference areas 823, and an operation of determining a skin color of the skin area 821 by comparing the first colorimetric information and the second colorimetric information.

The color palette 100 according to various embodiments may include the central section 121 which is provided to define the skin area 821 and is an empty space or transparent and the multiple color sections 123 which are provided to define the reference areas 823, arranged to surround the central section 121, and arranged according to a rule determined based on at least one color characteristic.

According to various embodiments, the color characteristic may include at least any one of brightness or a tone of a color provided to each of the color sections 123.

According to various embodiments, the color sections (a, b, c, d, e, and f) 123 may include the first color section (a), the second color section (d), the third color section (b), the fourth color section (f), the fifth color section (e) and the sixth color section (c) which are counterclockwise arranged.

According to various embodiments, brightness may be lower in order of the first color section (a), the third color section (b), the sixth color section (f), the second color section (d), the fifth color section (e), and the fourth color section (f).

According to various embodiments, a tone may be lower in order of the sixth color section (f), the first color section (a), the third color section (b), the second color section (d), the fifth color section (e), and the fourth color section (f).

According to various embodiments, the operation of determining a skin color may include an operation of determining whether the reference areas 823 are arranged identically with the rule based on the second colorimetric information for the reference areas 823 and an operation of determining a skin color of the skin area 821 by comparing the first colorimetric information and second colorimetric information if the reference areas 823 are arranged identically with the rule.

According to various embodiments, the first colorimetric information may include at least any one of brightness or a tone of the skin area 821. The second colorimetric information may include at least any one of brightness or a tone of each of the reference areas 823.

According to various embodiments, if the reference areas 823 are arranged differently from the rule, the process may return to the operation of capturing the facial image 800.

According to various embodiments, the operation of determining a skin color may include an operation of displaying color information representing the skin color.

According to various embodiments, the operation of determining a skin color may include an operation of transmitting color information to an external device.

According to various embodiments, the operation of determining a skin color may include an operation of calibrating the facial image 800 based on the skin color.

According to various embodiments, the electronic device 200 can more accurately determine a skin color in a facial image 800 including the color palette 100 with reference to a color characteristic of the color palette 100. In this case, a user can directly define a portion in which a skin color is to be identified by adjusting a location of the color palette in the face of the user. Accordingly, the electronic device 200 can determine a skin color with respect to various portions of the face. Accordingly, the user can check a change in the skin according to at least any one of time or a place. Accordingly, the user may consider the skin color determined by the electronic device 200 in selecting cosmetics. Moreover, the electronic device 200 can transmit, to an external device, information on a skin color of the user. Accordingly, consumer needs can be satisfied because a cosmetic maker having the external device uses the information to research and fabricate a product. Furthermore, the electronic device 200 can calibrate a facial image 800 based on a skin color of a user. Accordingly, the size of an error when the electronic device 200 calibrating the facial image 800 can be minimized.

The electronic device according to various embodiments disclosed in this document may be various types of devices. The electronic device may include a portable communication device (e.g., a smartphone), a computer device, a portable multimedia device, a portable medical device, a camera, a wearable device or home appliances, for example. The electronic device according to various embodiments of this document is not limited to the aforementioned devices.

Various embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar elements. An expression of the singular number may include an expression of the plural number unless clearly defined otherwise in the context. In this document, an expression, such as "A or B", "at least one of A and/or B", "A, B or C" or "at least one of A, B and/or C", may include all of possible combinations of listed items together. Expressions, such as "a first," "a second," "the first" or "the second", may modify corresponding elements regardless of its sequence or importance, and are used to only distinguish one element from the other element and do not limit corresponding elements. When it is described that one (e.g., a first) element is "(functionally or communicatively) connected to" or "coupled with" the other (e.g., a second) element, one element may be directly connected to the other element or may be connected to the other element through another element (e.g., a third element).

The term "module" used in this document may include a unit implemented as hardware, software or firmware, and may be interchangeably used with a term, such as logic, a logical block, a part, or a circuit. The module may be an integrated part or a minimum unit in which one or more functions are performed or a part thereof. For example, the module may be implemented as an application-specific integrated circuit (ASIC).

Various embodiments of this document may be implemented as software including one or more instructions stored in a storage medium (e.g., the memory 250) readable by a machine (e.g., the electronic device 200). For example, a processor (e.g., the processor 260) of the machine may invoke at least one of the one or more instructions stored in the storage medium, and may execute the instruction. This enables the machine to operate to perform at least one function based on the invoked at least one instruction. The one or more instructions may include a code generated by a complier or a code executable by an interpreter. The storage medium readable by the machine may be provided in the form of a non-transitory storage medium. In this case, the term "non-transitory" merely means that the storage medium is a tangible device and does not include a signal (e.g., electromagnetic waves). The term does not distinguish between a case where data is semi-permanently stored in the storage medium and a case where data is temporally stored in the storage medium.

According to various embodiments, each (e.g., a module or a program) of the aforementioned elements may include a single entity or a plurality of entities. According to various embodiments, one or more of the aforementioned components or steps may be omitted or one or more other components or steps may be added. Alternatively or additionally, a plurality of components (e.g., modules or programs) may be integrated into a single component. In such a case, the integrated component may identically or similarly perform a function performed by a corresponding one of the plurality of components before one or more functions of each of the plurality of components. According to various embodiments, steps performed by a module, a program or another component may be executed sequentially, in parallel, iteratively or heuristically, or one or more of the steps may be executed in different order or may be omitted, or one or more other steps may be added.

The invention claimed is:

1. An operating method of an electronic device, comprising:
executing an application;
capturing a facial image comprising a color palette;
extracting a skin area and multiple reference areas from the facial image based on the color palette;
detecting first colorimetric information for the skin area and second colorimetric information for the reference areas; and
determining a skin color of the skin area by comparing the first colorimetric information and the second colorimetric information,
wherein the color palette comprises:
a central section which is provided to define the skin area and is configured to be an empty space or a transparent area, and
multiple color sections provided to define the reference areas and arranged to surround the central section, colors in the color sections being arranged according to a rule based on at least one color characteristic indicating brightness pattern and/or tone pattern of the colors in the color sections,
wherein the determining of the skin color comprises:
determining whether colors in the reference areas of the facial image are arranged identically with the rule based on a comparison between the second colorimetric information for the reference areas and the at least one color characteristic; and either
determining the skin color of the skin area by comparing the first colorimetric information and the second colorimetric information if the colors in the reference areas are arranged identically with the rule; or
requesting a re-capturing of the facial image if the colors in the reference areas are arranged differently from the rule.

2. The method of claim 1, wherein the color sections comprises a first color section, a second color section, a third color section, a fourth color section, a fifth color section and a sixth color section which are counterclockwise arranged,
wherein the brightness pattern indicates that brightness is lower in order of the first color section, the third color section, the sixth color section, the second color section, the fifth color section, the fourth color section, and
wherein the tone pattern indicates that tone is lower in order of the sixth color section, the first color section, the third color section, the second color section, the fifth color section, and the fourth color section.

3. The method of claim 1, wherein the first colorimetric information comprises at least any one of brightness or a tone of the skin area, and
wherein the second colorimetric information comprises brightness and/or a tone of each of the colors in the reference areas.

4. The method of claim 1, wherein the determining of the skin color comprises at least any one of:
displaying the color information representing the skin color, or
transmitting the color information to an external device.

5. The method of claim 1, wherein the determining of the skin color comprises calibrating the facial image based on the skin color.

6. An electronic device comprising:
a camera module; and
a processor coupled to the camera module, wherein the processor is configured to:
execute an application,
capture a facial image comprising a color palette through the camera module,
extract, from the facial image, a skin area and multiple reference areas corresponding to the color palette,
detect first colorimetric information for the skin area and second colorimetric information for the reference areas, and
determine a skin color of the skin area by comparing the first colorimetric information and the second colorimetric information, wherein the color palette comprises:
a central section which is provided to define the skin area and is configured to be an empty space or a transparent area, and
multiple color sections provided to define the reference areas and arranged to surround the central section, colors in the color sections being arranged according to a rule based on at least one color characteristic indicating brightness pattern and/or tone pattern of the colors in the color sections,
wherein the processor is configured to:
determine whether colors in the reference areas of the facial image are arranged identically with the rule based on a comparison between the second colorimetric information for the reference areas and the at least one color characteristic, and either
determine the skin color of the skin area by comparing the first colorimetric information and the second colorimetric information if the colors in the reference areas are arranged identically with the rule, or
request a re-capturing of the facial image if the colors in the reference areas are arranged differently from the rule.

7. The electronic device of claim 6, wherein the color sections comprises a first color section, a second color section, a third color section, a fourth color section, a fifth color section and a sixth color section which are counterclockwise arranged,
wherein the brightness pattern indicates that brightness is lower in order of the first color section, the third color section, the sixth color section, the second color section, the fifth color section, the fourth color section, and
wherein the tone pattern indicates that tone is lower in order of the sixth color section, the first color section, the third color section, the second color section, the fifth color section, and the fourth color section.

8. The electronic device of claim 6, wherein:
the first colorimetric information comprises at least any one of brightness or a tone of the skin area, and
the second colorimetric information comprises brightness and/or a tone of each of the colors in the reference areas.

9. The electronic device of claim 6, further comprising at least any one of:
a display module coupled to the processor and for displaying color information representing the skin color by the processor, or
a communication module coupled to the processor and for transmitting the color information to an external device by the processor.

10. The electronic device of claim 6, wherein the processor is configured to calibrate the facial image based on the skin color.

* * * * *